(12) United States Patent
Leung et al.

(10) Patent No.: US 7,539,156 B2
(45) Date of Patent: May 26, 2009

(54) METHOD AND APPARATUS FOR PROVISIONING AND ACTIVATION OF AN EMBEDDED MODULE IN AN ACCESS TERMINAL OF A WIRELESS COMMUNICATION SYSTEM

(75) Inventors: Nikolai Konrad Nepomuceno Leung, Takoma Park, MD (US); Sivaramakrishna Veerepalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 624 days.

(21) Appl. No.: 10/965,940

(22) Filed: Oct. 15, 2004

(65) Prior Publication Data

US 2005/0111463 A1 May 26, 2005

Related U.S. Application Data

(60) Provisional application No. 60/512,595, filed on Oct. 17, 2003, provisional application No. 60/568,198, filed on May 4, 2004.

(51) Int. Cl.
*H04W 4/00* (2006.01)
(52) U.S. Cl. .................................. 370/313; 455/435.2
(58) Field of Classification Search ............ 370/395.52, 370/313
See application file for complete search history.

(56) References Cited

U.S. PATENT DOCUMENTS

| | | | |
|---|---|---|---|
| 6,529,729 B1 | 3/2003 | Nodoushani et al. | |
| 6,587,684 B1 | 7/2003 | Hsu et al. | |
| 6,622,017 B1 | 9/2003 | Hoffman | |
| 6,704,411 B1 * | 3/2004 | Nishidate | 379/265.09 |
| 6,961,567 B1 * | 11/2005 | Kuhn | 455/435.1 |
| 7,092,375 B2 * | 8/2006 | Pitsoulakis | 371/338 |
| 7,266,369 B2 | 9/2007 | Moles et al. | |
| 2002/0029252 A1 * | 3/2002 | Segan et al. | 709/217 |
| 2002/0191575 A1 * | 12/2002 | Kalavade et al. | 370/338 |
| 2003/0035471 A1 * | 2/2003 | Pitsoulakis | 375/222 |
| 2004/0043788 A1 * | 3/2004 | Mittal | 455/558 |
| 2005/0048997 A1 * | 3/2005 | Grobler et al. | 455/550.1 |
| 2005/0079863 A1 * | 4/2005 | Macaluso | 455/419 |

FOREIGN PATENT DOCUMENTS

| | | |
|---|---|---|
| EP | 1043906 | 10/2000 |
| GB | 2372675 | 8/2002 |
| WO | 0217073 | 2/2002 |

OTHER PUBLICATIONS

Taylor, A: "Over-The-Air Service Provisioning" Annual Review of Communications, National Engineering Consortium, Chicago, IL, US 1998, XP000793196; vol. 51, pp. 953-959.

(Continued)

*Primary Examiner*—Edan Orgad
*Assistant Examiner*—Sori A Aga
(74) *Attorney, Agent, or Firm*—Alodollah Kafloab; Kristine U. Ekwueme

(57) ABSTRACT

A method and apparatus for provisioning modules in a mobile computing device is described. A software application and parameters related to an operator profile are used to permit a user of a mobile computing device to access a wireless communication network where there is wireless communication coverage. The methods and apparatus described herein provide the user of a mobile computing device flexibility and convenience when accessing wireless communication service.

16 Claims, 6 Drawing Sheets

OTHER PUBLICATIONS

Standards Proposal No. 4742, Proposed Revision of TIA/EIA-683-A, "Over the Air Provisioning of Mobile Stations in Spread Spectrum Systems," EIA/TIA Drafts, Dec. 20, 2000, XP017000419.

International Search Report—PCT/US04/034513, International Search Authority—European Patent Office, Feb, 28, 2005.

* cited by examiner

METHOD AND APPARATUS FOR PROVISIONING AND ACTIVATION OF AN EMBEDDED MODULE IN AN ACCESS TERMINAL OF A WIRELESS COMMUNICATION SYSTEM

PRIORITY CLAIM UNDER 35 U.S.C. §119

This application claims priority to U.S. Provisional Application No. 60/512,595 filed Oct. 17, 2003, entitled "Provisioning and Activation for Embedded Modules," by Nikolai Leung et al., which is incorporated herein by reference in its entirety.

This application also claims priority to U.S. Provisional Application No. 60/568,198 filed May 4, 2004, entitled "Provisioning and Activation for CDMA Modules Embedded in Mobile Computing device," by Nikolai Leung, which is incorporated herein by reference in its entirety.

BACKGROUND

1. Field

The present invention relates generally to communications and, more specifically, to provisioning and activation of an embedded module in an access terminal in a wireless communication system.

2. Background

With the proliferation of wireless communication capability in a wide variety of applications, many laptop computers and other computing devices, require cellular or other wireless access. The wireless functions are provided by a module located within the laptop or other computing device. Such wireless access is through a service provider or carrier. The service provider or carrier requires provisioning and activation of the embedded device for wireless access to ensure payment for services, avoid fraudulent uses and provide accounting and billing information. Typically, when a user purchases a cellular phone, the phone is provisioned and activated at the point of purchase or by over-the-air (OTA) provisioning. Point of purchase service provisioning is not convenient for computing devices with embedded modules, as the modules are not typically accessible in a store selling computing devices. Further, the point of purchase of the computing device is not typically capable of providing provisioning and activation, and would force the user to take the computing device to another store for provisioning and activation.

There is a need therefore, for a method and apparatus of provisioning and activating a module, used for wireless communication, within a computing or other device, such as a laptop computer. Further, there is a need to allow over-the-air provisioning (OTA) and authentication of such devices.

SUMMARY

Embodiments disclosed herein address the above stated needs by a method for provisioning a wireless communication module. The method includes initiating an over-the-air service and provisioning procedure from a mobile computing device embedded with a wireless communication module. A request is received at the mobile computing device for provisioning information from a carrier using the over-the-air service and provisioning procedure. Confirmation is received at the mobile communication device of provisioning from the carrier via the over-the-air service and provisioning procedure.

In another aspect of the present invention, a user interface application for a mobile computing device is provided. The user interface application is configured to initiate a signal to an embedded module to connect a packet data service option for a wireless network. The application is further configured to initiate a web browser on the mobile communication device and direct the browser to the wireless network server once a packet data secession is established and the mobile communication device is assigned an IP address.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

DETAILED DESCRIPTION

Figure 1:
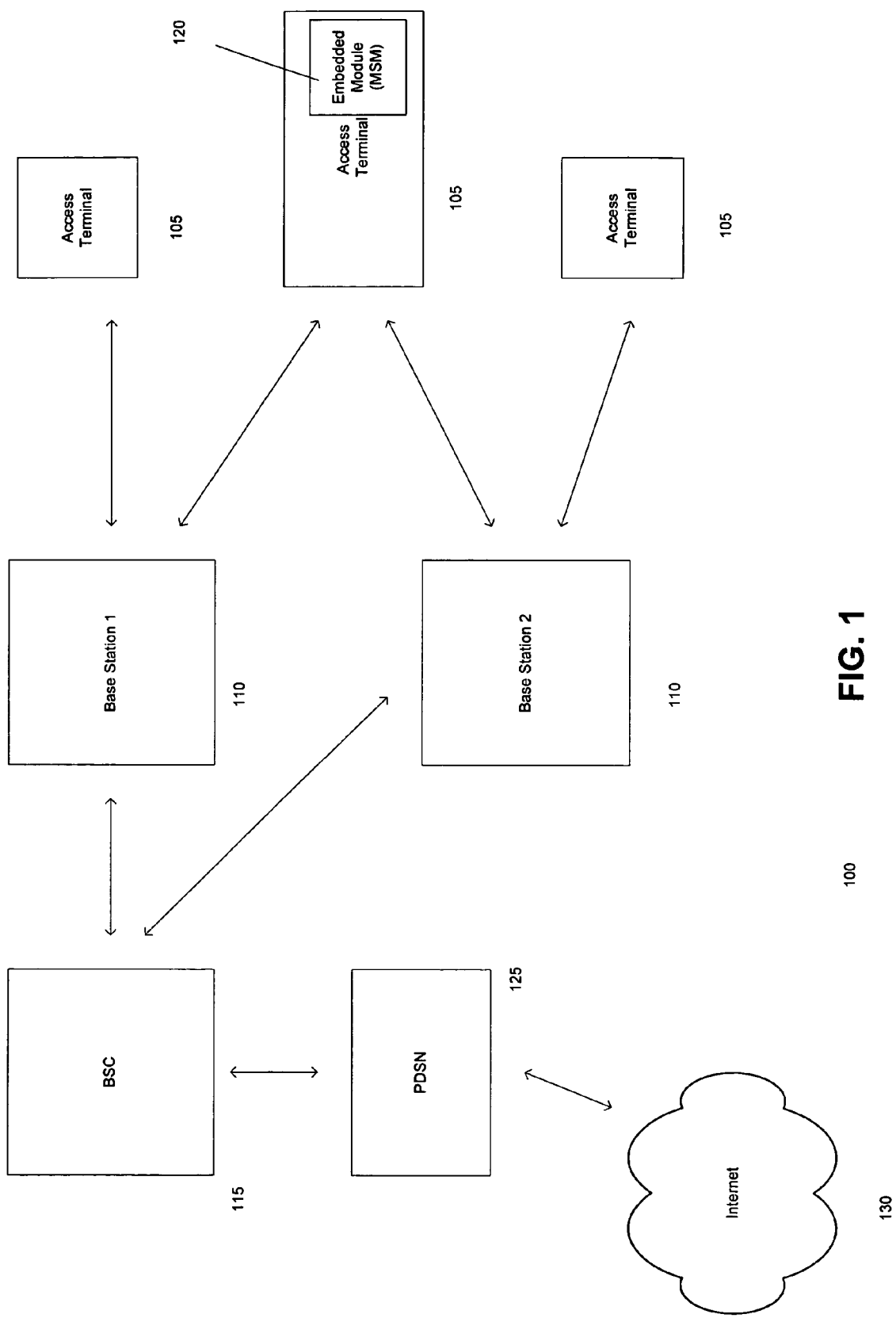
FIG. 1 illustrates a wireless communication system that includes a plurality of access terminals for communication therein.

Referring to FIG. 1, a wireless communication system 100 is shown according to one embodiment of the present invention. A wireless subscriber station, referred to herein as an access terminal (AT) 105, may be mobile or stationary, and may communicate with one or more wireless base stations 110. The access terminal 105 transmits and receives data packets through the one or more base stations 110 to a base station controller (BSC) 115. The base stations 110 and base station controller 115 are parts of a network called an access network. An access network transports data packets between multiple access terminals 105. The access network may be further connected to additional networks outside the access network, such as a packet data serving network (PDSN) 125, and the Internet 130, and may transport data packets between each access terminal 105 and such outside networks.

The communication link through which the access terminal 105 sends signals to the base stations 110 is called a reverse link. The communication link through which a base station 110 sends signals to an access terminal 105 is called a forward link. An access terminal 105 that has established an active traffic channel connection with one or more base stations 110 is called an active access terminal, and is said to be in a traffic state. An access terminal 105 that is in the process of establishing an active traffic channel connection with one or more base stations 110 is said to be in a connection setup state.

An access terminal 105 may be any data device that communicates through a wireless channel or, alternatively, may communicate through a wired channel (e.g, using fiber optic or coaxial cables). In accordance with the illustrated embodiment, the access terminal 105 takes the form of a mobile computing device, such as a laptop computer, for example, that is configured with a wireless communication module for enabling wireless communication with the base stations 110. The access terminal 105 may further take the form of a number of types of other devices including, but not limited to, a PC card, external or internal modem, wireless phone, PDA, and the like.

According to one embodiment, each of the access terminals 105 is configured with an embedded module 120, which may take the form of a mobile station modem (MSM). The embedded module 120 receives communication signals from the base station 110 on the forward link and transmits communication signals to the base station 110 on the reverse link.

Figure 2:
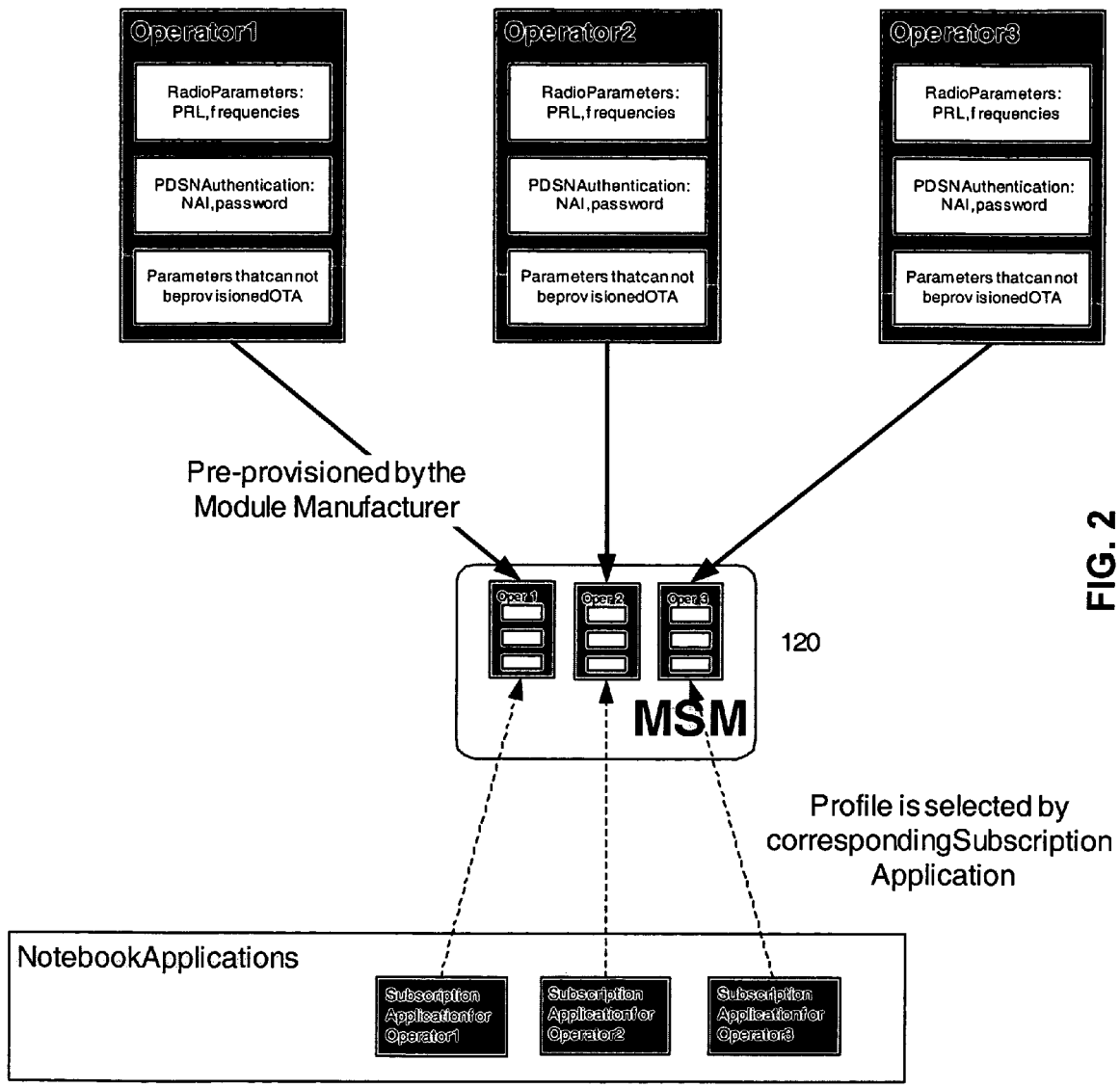
FIG. 2 is an exemplary diagram of one embodiment of pre-provisioning operator profiles into the embedded module of an access terminal.

FIG. 2 illustrates a procedure whereby the manufacture of the module 120 pre-provisions the supported subscription profiles for each service provider (i.e., wireless operator) into the module 120 before shipping it to the vendor of the access terminal 105. Once the module 120 has been embedded in the access terminal 105, the user clicks on the selected operator's subscription application that was pre-provisioned by the manufacture of the module 120, which commands the module 120 to use the associated subscription profile for originating a packet data session with the particular service provider (i.e., operator).

Updating of the subscription profile within the module 120 may be needed if the subscription parameters for an operator change before the module 120 has been activated. This may be accomplished without removing the embedded module 120 from the access terminal 105, and may be achieved in one of two ways. First, the vendor of the access terminal 105 may temporarily load an application on to the access terminal 105 that preloads into the module 120 an updated subscription profile for the particular service provider (operator). Alternatively, the access terminal 105 vendor may connect a subscription profile loading tool through the access terminal's USB port, for example, to update the subscription profile on the module 120.

Figure 3:
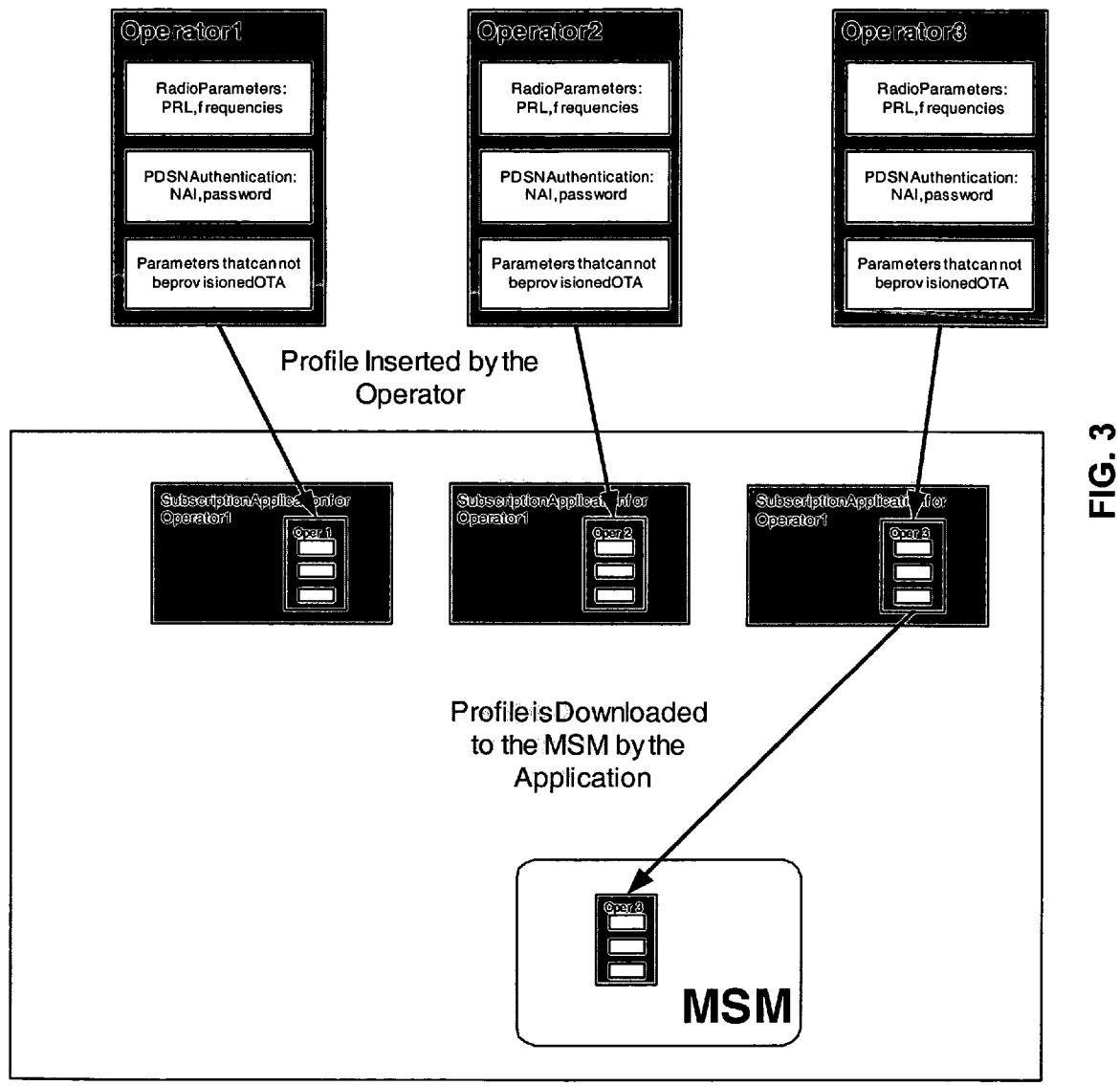
FIG. 3 is an exemplary diagram of application-based operator profiles within an embedded module of an access terminal in accordance with one embodiment.

FIG. 3 illustrates a procedure whereby the access terminal 105 contains a stored subscription application of the operator, which retains the subscription profile specific to that wireless operator. When the user selects the subscription application for the selected operator via the access terminal 105, the selected application downloads the profile into the module 120 and commands the module 120 to start a packet data session with the selected wireless operator. This method provides a convenient means for the operator to update its subscription profile if needed. The operator updates the profile in the subscription application and provides this to the access terminal 105 vendor. Before shipping a unit, the access terminal 105 vendor preloads the operator's most recent application on the access terminal 105 or may provide the subscription application on an accompanying CD-ROM that is provided when the user purchases the access terminal 105 from the vendor.

To support a "generic" module 120 (i.e., applicable to more than one service provider (operator), the mobile station modem (MSM) would need to support multiple operator subscription profiles. If the preloaded subscription profiles illustrated in FIG. 2 are used, it would be desirable for the MSM to support the following:

Multiple subscription profiles in NV RAM that are preloaded by the module 120 vendor.

An interface that allows the subscription application to indicate to the MSM which subscription profile to use.

An interface to a subscription-profile-loading-application on the access terminal 105 or an interface to a loading tool connected through the access terminal's 105 USB interface. These can be used by the access terminal vendor if it is necessary to update preloaded profiles in a module 120 already embedded in an access terminal without removing the module 120.

If the application download procedure illustrated in FIG. 3 is used, then it would be desirable for the MSM to support an interface that allows the subscription application to download the subscription parameters into NV RAM. If a module PIN-lock mechanism is used to secure shipped modules 120, the MSM would perform the following:

MSM locks the module for mobile-initiated wireless communication network access until the correct PIN is entered.

MSM provides an interface to a access terminal application (e.g., via NDIS for Windows Operating Systems) to allow entry of PIN.

MSM computes the PIN based on a predefined function of a unique module parameter provisioned via OTAPA (e.g., PIN=hash of MIN).

To prevent brute force PIN attacks from an application on the access terminal, the MSM can restrict the number of PIN attempts and/or monotonically extend the time between successive PIN attempts each time one fails. For security, if the number of allowable attempts is exceeded, the MSM would have to be re-provisioned via OTAPA to accept new PIN attempts.

If the function for computing the PIN is going to be operator-defined (e.g., particular hash function of particular OTAPA parameter), the MSM would need to support this operator-definable-feature. The function definition would be pre-preloaded into the module 120 as part of the operator's subscription profile.

As previously discussed, the module 120 can be embedded in the access terminal 105 before the access terminal 105 is sold to the user. The module 120 can be embedded in the access terminal 105 during manufacture or at the point of sale. A subscription application is preloaded on the access terminal 105 by the access terminal vendor or is provided on an installation CD.

Figure 4:
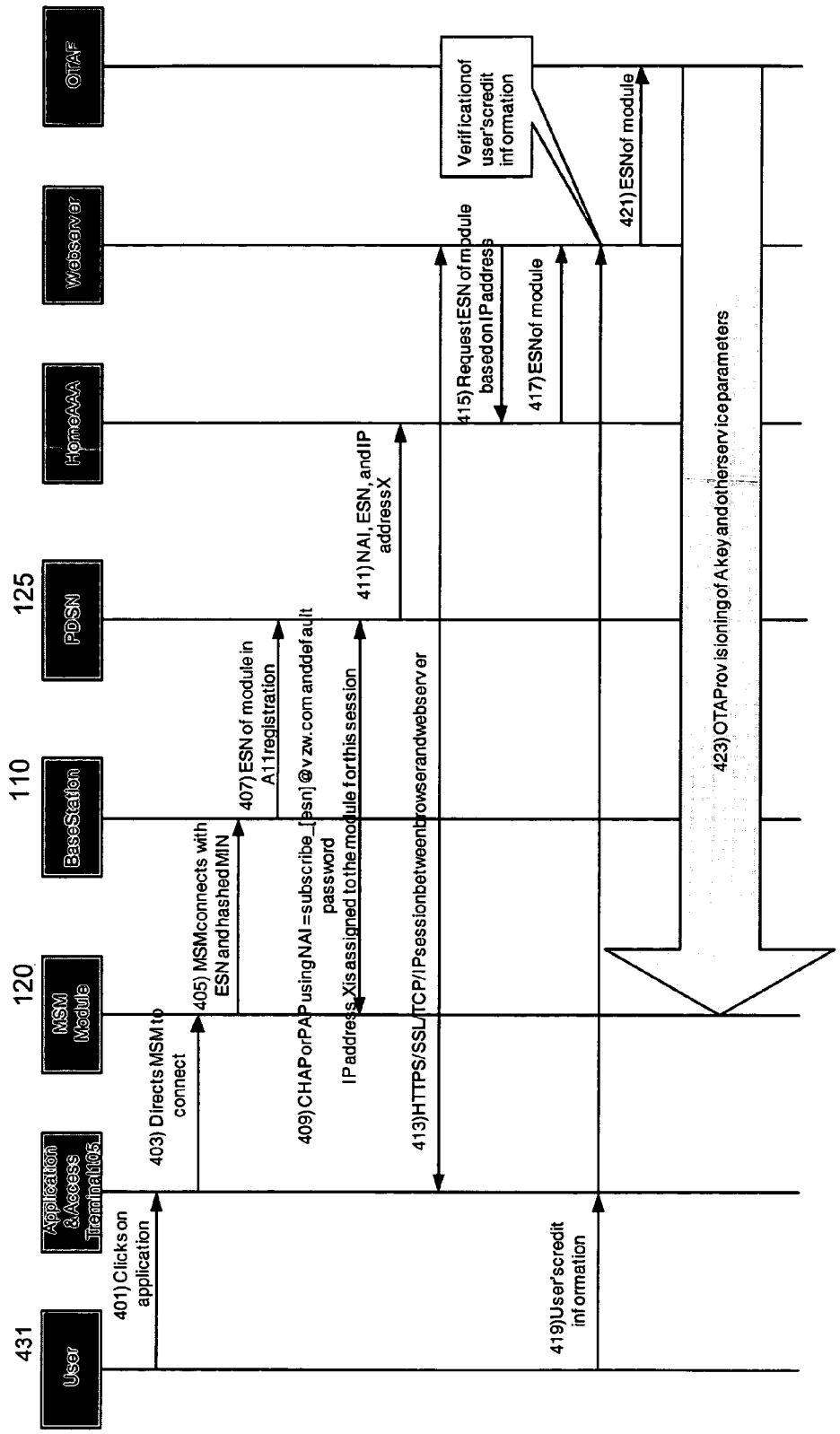
FIG. 4 is an exemplary diagram illustrating the signaling flow of a method to set up OTAPA provisioning of an embedded module in an access terminal.

FIG. 4 illustrates signaling flow for setting up over-the-air parameter administration (OTAPA) provisioning of an embedded module 120 within the access terminal 105. At step 401, the user starts the subscription application, which instructs the module 120 to initiate a subscription to the wireless communication provider at step 403. The module 120 uses a subscription profile, which includes default parameters needed for initiating the call on the wireless communication network. At step 405 the module 120 initiates the call using the module's electronic serial number (ESN) and a mobile identification number (MIN) based on a hashing function using the module's ESN. The radio access network allows the packet data session to connect even if the MIN is not that of a subscribed module 120. At step 407, the module's ESN is communicated to the PDSN 125 in the Radio Packet Connection Setup Airlink Record sent via the A11 interface over a wireless communication channel. At step 409, the module 120 establishes an IP call and uses the preloaded default network access identifier (NAI) (e.g. [esn]@ subscribe.vzw.com in the Verizon network, for example) and password to authenticate itself to the PDSN 125 via Challenge Handshake Authentication Protocol (CHAP). The PDSN 125 accepts these default authentication parameters and provides the module 120 an IP address, X. Since the default parameters indicate that the user has not yet subscribed, the PDSN 125 limits the traffic from this user to only the operator's subscription web server. At step 411, the PDSN 125 instructs the provisioning Authentication Authorization and Accounting (AAA) server to generate a record for the module 120, including the default Network Address Identifier (NAI), ESN, and IP address assigned by the PDSN 125 to the module 120. Having the NAI include the ESN of module 120 produces unique NAI's, which is useful if the provisioning AAA server is organizing its records based on the NAI. This prevents the provisioning AAA server from overwriting records when multiple modules are attempting to subscribe for service at approximately the same time.

Once the access terminal subscription application determines that an IP address has been assigned to the access terminal 105, the application launches a standard web browser on the access terminal at step 413. The application directs the browser to the subscription server's URL or IP address where a webpage presents the user with various subscription plans. The browser uses standard Internet e-commerce security protocols to authenticate the subscription server (e.g., digital certificates signed by VeriSign) and exchange encrypted financial information.

At step 415, once the user has selected a subscription plan, the web server uses the IP address from the current IP transaction with the user's web browser on the access terminal 105 to determine the ESN of the module 120. The web server queries the provisioning AAA server for the ESN of the module based on IP address X. The web server's request for the ESN needs to be made while the HTTP transaction with the user is still active so that the PDSN 125 keeps IP address X assigned to the module 120. The Provisioning AAA server searches its records keying off of IP address X to determine the ESN of the module 120. If an ESN is located, then this is returned to the web server at step 417. Once the web server has obtained the ESN information, it can query the user to enter their credit and account information. This is provided by the user over a secure HTTPS/SSL link to the web server in step 419. Once the user's credit information has been verified, the web server indicates the ESN of the module 120 to the Over-the-Air Service Provisioning Function (OTAF) at step 421. Once the module 120 is able to receive an OTAPA call, the OTAF uses the ESN to contact and provision the module 120 at step 423. It will be appreciated that in an alternative embodiment, OTASP can be used in step 423. Once the subscription application has been notified that step 411 has been completed, the application commands the module 120 to make an OTASP call when the module 120 is within wireless communication network coverage.

To support the generic module 120, the MSM would support multiple operator subscription profiles. As described in steps 403, 405, and 409 in FIG. 4, the un-provisioned wireless communication module 120 needs a set of parameters that allow it to acquire a radio traffic channel for subscription purposes. The module also needs PDSN 125 authentication parameters to obtain access through the PDSN 125 to the subscription server. Since these sets of parameters are different across operators, a generic module 120 would need to support different sets of subscription parameters, referred to here as subscription profiles. Each subscription profile would contain the following sets of parameters:

Parameters needed to acquire radio traffic channel
Frequencies
PRL (Preferred Roaming List)
ESN hashing function to produce default MIN
PDSN authentication parameters
Default NAI (e.g. [esn]@subscribe.vzw.com)
Default Password Service parameters that can not be provisioned Over-the-Air
For example, RSA Public Key for Verizon's Dynamic Mobile IP Key Update (DMU) Procedures This last set of parameters is included in the subscription profile since it can not be provisioned via OTA procedures.

In another embodiment, the user of the access terminal 105 can request subscription over a wireline connection. In this embodiment, the user of the access terminal 105 uses a wireline Internet connection to connect the access terminal 105 to the wireless communication service provider and perform the activation process via a wired connection. Also, since the server can not establish a direct and secure IP connection to the MSM over wireline, there is no secure way for the server to automatically obtain the ESN of the module 120. Automated methods would be open to a virus/worm providing a different ESN to the server.

Wireline subscription may be useful as a back-up method for special cases where the subscriber has access to a wireline connection and is willing to manually provide the module ESN to the subscription website. For example, a company's IT department can use this method to subscribe multiple mobile computing device—embedded modules 120.

Figure 5:
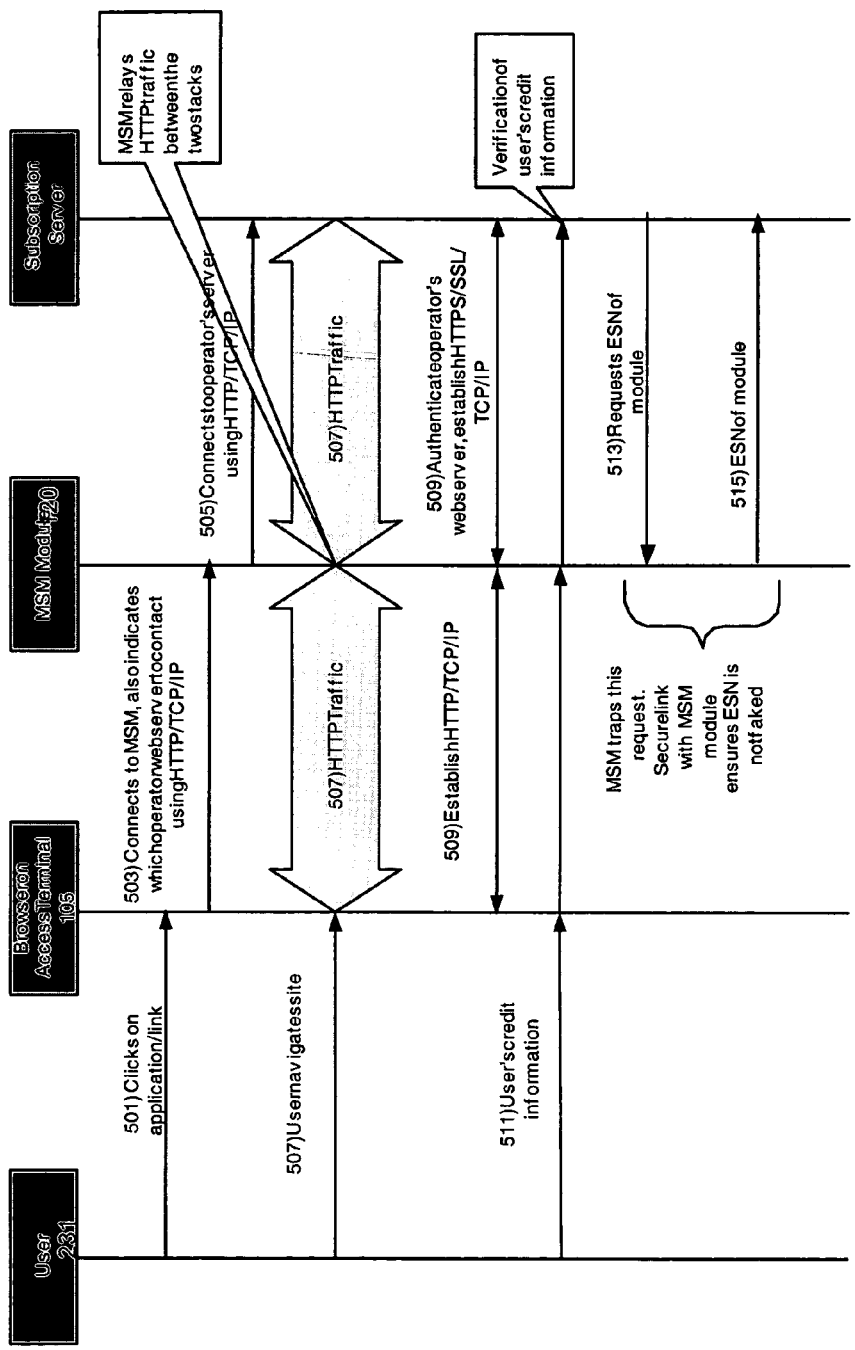
FIG. 5 is an exemplary diagram illustrating the signaling flow using a mobile station modem as HTTP proxy.

FIG. 5 illustrates a method, which uses communication from the user's browser to be sent directly to the module 120, and serves as a proxy and passes this information through its secure link to the subscription server. The MSM 120 serves as an HTTP proxy to allow the HTML traffic from the subscription server to be displayed on the user's browser at the access terminal 105. At step 501, the user launches an application/link on the browser on the access terminal 105. At step 503, the access terminal 105 connects to the MSM and indicates which operator webserver to contact using HTTP/TCP/IP. At step 505, the MSM connects to the operator's server using HTTP/TCP/IP. At step 507, the MSM relays HTTP traffic between the access terminal 105 and MSM stack and the MSM and subscription server stack. At step 509, the subscription server authenticates the webserver and establishes a HTTP/SSL/TCP/IP secession and the MSM establishes a HTTP/TCP/IP secession with the access terminal 105. At step 511, the user enters credit information on the access terminal 105. At step 513, the subscription server requests the ESN of the module 120. At step, 515 the MSM 120 sends the ESN of the module 120 to the subscription server.

Figure 6:
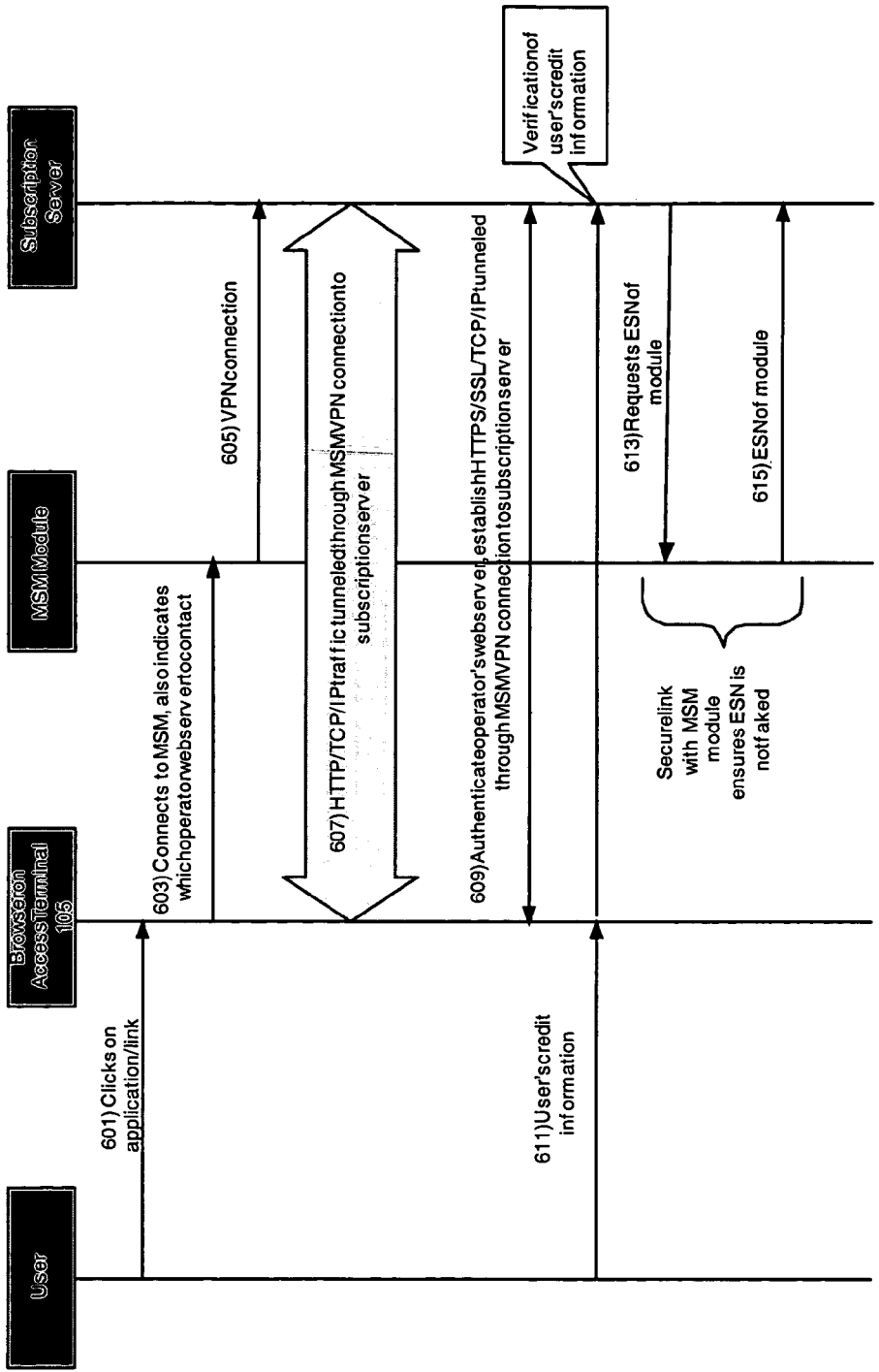
FIG. 6 is an exemplary diagram illustrating the signaling flow using the embedded module to establish a VPN connection to a subscription server.

FIG. 6 illustrates another embodiment, where the user's browser on the access terminal 105 establishes a secure end-to-end HTTPS/SSL/TCP/IP session with the subscription server tunneled through the MSM's VPN connection. This end-to-end session allows the browser to authenticate the subscription server and secure any user credit information being sent. At step 601, the user launches an application/link on the browser on the access terminal 105. At step 603, the browser running on the access terminal 105 connects to the MSM and indicates which operator webserver to contact using HTTP/TCP/IP. At step 605, the MSM connects to the operator's server using a voice privacy network (VPN) connection. At step 607, HTTP/TCP/IP traffic is tunneled through the MSM VPN connection between the access terminal 105 and the subscription server. At step 609, the subscription server authenticates the webserver and establishes a HTTP/SSL/TCP/IP secession tunneled through the MSM VPN connection between the access terminal 105 and the subscription server. At step 611, the user enters credit information on the access terminal 105. At step 613, the subscription server requests the ESN of the module 120. At step 615, the MSM 120 sends the ESN of the module 120 to the subscription server.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for provisioning and activating a wireless communication module embedded within a mobile computing device, comprising:
    selecting a pre-provisioned subscription application for a wireless operator on the mobile communication device, wherein the subscription application includes a corresponding subscription profile comprising default parameters that indicate a non-subscribing user and that limit a call on a wireless network of the selected wireless operator to a subscription server of the selected wireless operator, wherein the application instructs the wireless communication module to use the subscription profile to initiate a packet data session with the subscription server of the wireless operator;
    generating default mobile identification number based on an electronic serial number of the wireless communication module;
    establishing a call on the wireless network using at least a portion of the default parameters, the electronic serial number, and the default mobile identification number;
    providing the electronic serial number to the wireless operator in response to a request from the wireless operator; and
    using the electronic serial number to provision and a activate the wireless communication module for the wireless network corresponding to the selected wireless operator.

2. A method for a user interface application for provisioning and activating a wireless communication module embedded within a mobile computing device, comprising:
    receiving a selection of a pre-provisioned subscription application for a wireless operator on the mobile communication device, wherein the subscription application includes a corresponding subscription profile comprising default parameters that indicate a non-subscribing user and that limit a call on a wireless network of the selected wireless operator to a subscription server of the selected wireless operator, wherein the application instructs the wireless communication module to use the respective subscription profile to initiate a packet data session with the subscription server of the selected wireless operator;
    generating a default mobile identification number based on an electronic serial number of the wireless communication module;
    initiating a packet data session with the subscription server of the selected wireless operator; and
    initiating a web browser on the mobile communication device and directing the browser to the subscription server once the packet data session is established and the mobile communication device is assigned an IP address.

3. The method of claim 1, further comprising:
    assigning an IP address to the wireless communication module once the packet data session is established; and
    launching and directing a web browser on the mobile computing device to the subscription server to initiate an over the air service and provisioning procedure.

4. The method of claim 1, further comprising:
    launching an application on a browser at the mobile computing device; and
    indicating to the wireless communication module the subscription server to contact to using HTTP/TCP/IP.

5. An apparatus for provisioning and activating a wireless communication module embedded within a mobile computing device, comprising:
    means for selecting a pre-provisioned subscription application for a wireless operator on the mobile communication device, wherein the subscription application includes a corresponding subscription profile comprising default parameters that indicate a non-subscribing user and that limit a call on a wireless network of the selected wireless operator to a subscription server of the selected wireless operator, wherein the application instructs the wireless communication module to use the subscription profile to initiate a packet data session with the subscription server of the wireless operator;
    means for generating a default mobile identification number based on an electronic serial number of the wireless communication module;
    means for establishing a call on the wireless network using at least a portion of the default parameters, the electronic serial number, and the default mobile identification number;
    means for providing the electronic serial number to the wireless operator in response to a request from the wireless operator; and
    means for using the electronic serial number to provision and activate the wireless communication module for the wireless network corresponding to the selected wireless operator.

6. An apparatus for a user interface application for provisioning and activating a wireless communication module embedded within a mobile computing device, comprising:

means rot receiving a selection of a pre-provisioned subscription application for a wireless operator on the mobile communication device, wherein the subscription application includes a corresponding subscription profile comprising default parameters that indicate a non-subscribing user and that limit a call on a wireless network of the selected wireless operator to a subscription server of the selected wireless operator, wherein the application instructs the wireless communication module to use the respective subscription profile to initiate a packet data session with the subscription server of the selected wireless operator;

means for generating a default mobile identification number based on an electronic serial number of the wireless communication module;

means for initiating a packet data session with the subscription server of the selected wireless operator; and means for initiating a web browser on the mobile communication device and directing the browser to the subscription server once the packet data secession is established and the mobile communication device is assigned an IP address.

7. The apparatus of claim 5, further comprising:

means for assigning an IP address to the wireless communication module once the packet data session is established; and means for launching and directing a web browser on the mobile computing device to the subscription server to initiate an over the air service and provisioning procedure.

8. The apparatus of claim 5, further comprising:

means for launching an application on a browser at the mobile computing device; and means for indicating to the wireless communication module the subscription server to connect to using HTTP/TCP/IP.

9. A computer program product embodied in hardware for provisioning and activating a wireless communication module embedded within a mobile computing a device, comprising:

computer-readable medium comprising;

code for causing a computer to select a pre-provisioned subscription application for a wireless operator on a mobile communication device, wherein the subscription application includes a corresponding subscription profile comprising default parameters that indicate a non-subscribing user and that limit a call on a wireless network of the selected wireless operator to a subscription server of the selected wireless operator, wherein the application instructs the wireless communication module to use the subscription profile to initiate a packet data session with subscription server of the wireless operator;

code for causing the computer to generate a default mobile identification number based on an electronic serial number of the wireless communication module;

code for causing the computer for to establish a call on the wireless network using at least a portion of the default parameters, the electronic serial number, and the default mobile identification number;

code for causing the computer to provide the electronic serial number to the wireless operator in response to a request from the wireless operator; and code for causing the computer to use electronic serial number to provision and activate the wireless communication module for the wireless network corresponding to the selected wireless operator.

10. A computer program product embodied in hardware for provisioning and activating a wireless communication module embedded within a mobile computing device, comprising:

computer-readable medium comprising:

code for causing a computer to receive a selection of a pre-provisioned subscription application for a wireless operator on a mobile communication device, wherein the subscription application includes a corresponding subscription profile comprising default parameters that indicate a non-subscriber user and that limit a call on a wireless network of the selected wireless operator to a subscription server of the selected wireless operator, wherein the application instructs the wireless communication module to use the respective subscription profile to initiate a packet data session with the subscription server of the selected wireless operator;

code for causing the computer to generate a default mobile identification number based on an electronic serial number of the wireless communication module;

code for causing the computer to initiate a packet data session with a wireless operator; and code for causing the computer to initiate a web browser on the mobile communication device and directing the browser to the subscription server once the packet data session is established and the mobile communication device is assigned an IP address.

11. The method of claim 1, wherein the selecting is from a plurality of pre-provisioned subscription applications each corresponding to a different one of a plurality of wireless operators and each having a different one of a plurality of subscription profiles, wherein each subscription profile comprises respective default parameters that indicate the non-subscribing user and that limit the call on the wireless network of the selected wireless operator to the respective subscription server of the selected wireless operator, wherein the default parameters further include a default network access identifier and a default password both operable to authenticate the wireless communication module to a packet data serving node only for subscription purposes.

12. The method of claim 2, wherein the selecting is from a plurality of pre-provisioned subscription applications each corresponding to a different one of a plurality of wireless operators and each havina a different one of a plurality of subscription profiles, wherein each subscription profile comprises respective default parameters that indicate the non-subscribing user and that limit the call on the wireless network of the selected wireless operator to the respective subscription server of the selected wireless operator, wherein the default parameters further include a default network access identifier and a default password both operable to authenticate the wireless communication module to a packet data serving node only for subscription purposes.

13. The apparatus of claim 5, wherein the selecting is from a plurality of pre-provisioned subscription applications each corresponding to a different one of a plurality of wireless operators and each having a different one of a plurality of subscription profiles, wherein each subscription profile comprises respective default parameters that indicate the non-subscribing user and that limit the call on the wireless network of the selected wireless operator to the respective subscription server of the selected wireless operator, wherein the default parameters further include a default network access identifier and a default password both operable to authenticate the wireless communication module to a packet data serving node only for subscription purposes.

14. The apparatus of claim 6, wherein the selection is from a plurality of pre-provisioned subscription applications each corresponding to a different one of a plurality of wireless operators and each having a different one of a plurality of subscription profiles, wherein each subscription profile comprises respective default parameters that indicate the non-subscribing user and that limit the call on the wireless network of the selected wireless operator to the respective subscription server of the selected wireless operator, wherein the default parameters further include a default network access identifier and a default password both operable to authenticate the wireless communication module to a packet data serving the node only for subscription purposes.

15. The computer program product of claim 9, wherein the selecting is from a plurality of pre-provisioned subscription applications each corresponding to a different one of a plurality of wireless operators and each having a different one of a plurality of subscription profiles, wherein each subscription profile comprises respective default parameters that indicate the non-subscribing user and that limit the call on the wireless network of the selected wireless operator to the respective subscription server of the selected wireless operator, wherein the default parameters further include a default network access identifier and a default password both operable to authenticate the wireless communication module to a packet data serving node only for subscription purposes.

16. The computer program product of claim 10, wherein the selection is from a plurality of pre-provisioned subscription applications each corresponding to a different one of a plurality of wireless operators and each having a different one of a plurality of subscription profiles, wherein each subscription profile comprises respective default parameters that indicate the non-subscribing user and that limit the call on the wireless network of the selected wireless operator to the respective subscription server of the selected wireless operator, wherein the default parameters further include a default network access identifier and a default password both operable to authenticate the wireless communication module to a packet data serving node only for subscription purposes.

* * * * *

UNITED STATES PATENT AND TRADEMARK OFFICE
CERTIFICATE OF CORRECTION

| | | |
|---|---|---|
| PATENT NO. | : 7,539,156 B2 | Page 1 of 1 |
| APPLICATION NO. | : 10/965940 | |
| DATED | : May 26, 2009 | |
| INVENTOR(S) | : Leung et al. | |

It is certified that error appears in the above-identified patent and that said Letters Patent is hereby corrected as shown below:

Column 8, line 1, claim 1: "a activate" to read as --activate--

Column 8, line 59, claim 5: "number,and" to read as --number, and--

Column 9, line 4, claim 6: "rot" to read as --for--

Column 9, line 23, claim 6: "secession" to read as --session--

Column 9, line 42, claim 9: "a device" to read as --device--

Column 9, line 44, claim 9: "for to" to read as --to--

Column 9, line 59, claim 9: "comprising;" to read as --comprising:--

Column 9, line 61, claim 9: "parameters,the" to read as --parameters, the--

Column 10, line 7, claim 10: "device,comprising" to read as --device, comprising--

Column 10, line 14, claim 10: "non-subscriber user" to read as --non-subscribing user--

Column 10, line 47, claim 12: "havina" to read as --having--

Column 12, line 5, claim 15: "passwork" to read as --password--

Signed and Sealed this
Thirty-first Day of May, 2011

David J. Kappos
*Director of the United States Patent and Trademark Office*